United States Patent
Holloway et al.

(10) Patent No.: US 8,981,305 B2
(45) Date of Patent: Mar. 17, 2015

(54) INDEX OF REFRACTION MATCHED NANOPARTICLES AND METHODS OF USE

(75) Inventors: Paul Howard Holloway, Gainesville, FL (US); Jihun Choi, Fishkill, NY (US); Teng-Kuan Tseng, Gainesville, FL (US); Luiz G. Jacobsohn, Clemson, SC (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 126 days.

(21) Appl. No.: 13/460,886

(22) Filed: May 1, 2012

(65) Prior Publication Data
US 2013/0026371 A1  Jan. 31, 2013

Related U.S. Application Data

(60) Provisional application No. 61/485,245, filed on May 12, 2011.

(51) Int. Cl.
  *C09K 11/08* (2006.01)
  *G01T 1/20* (2006.01)
  *G01T 1/16* (2006.01)
  *C09K 11/02* (2006.01)
  *C09K 11/77* (2006.01)
  *B82Y 30/00* (2011.01)

(52) U.S. Cl.
  CPC .......... *G01T 1/2002* (2013.01); *G01T 1/16* (2013.01); *C09K 11/02* (2013.01); *C09K 11/7772* (2013.01); *B82Y 30/00* (2013.01)
  USPC .......................................................... 250/362

(58) Field of Classification Search
  CPC ..................... C09K 11/02; C09K 11/7761
  USPC .......................................................... 250/362
  See application file for complete search history.

(56) References Cited

U.S. PATENT DOCUMENTS

| | | | |
|---|---|---|---|
| 7,525,094 B2 | 4/2009 | Cooke et al. | |
| 7,608,829 B2 | 10/2009 | Loureiro et al. | |
| 7,628,548 B2 | 12/2009 | Benjamin et al. | |
| 7,708,476 B2 | 5/2010 | Liu | |
| 7,742,670 B2 | 6/2010 | Benjamin et al. | |
| 2006/0054863 A1 | 3/2006 | Dai et al. | |
| 2006/0083469 A1 | 4/2006 | Faid et al. | |
| 2007/0063208 A1* | 3/2007 | Klimov et al. | 257/97 |
| 2008/0128624 A1 | 6/2008 | Cooke et al. | |
| 2008/0251222 A1* | 10/2008 | Krietsch et al. | 162/110 |
| 2009/0116753 A1 | 5/2009 | Midgley et al. | |
| 2009/0169866 A1* | 7/2009 | Ostafin et al. | 428/323 |
| 2010/0002324 A1 | 1/2010 | Rozhin et al. | |
| 2010/0014817 A1 | 1/2010 | Liu | |
| 2012/0080070 A1* | 4/2012 | Tsakalakos et al. | 136/246 |
| 2012/0212733 A1* | 8/2012 | Kodali et al. | 356/301 |

FOREIGN PATENT DOCUMENTS

KR  100638827  10/2006

* cited by examiner

*Primary Examiner* — Marcus Taningco
(74) *Attorney, Agent, or Firm* — Thomas Horstemeyer LLP

(57) ABSTRACT

Embodiments of the present disclosure provide for nanoparticles, methods of making nanoparticles, materials including nanoparticles, the use of materials including nanoparticles, and the like.

34 Claims, 4 Drawing Sheets

- 0.2% (vol) NPs in PMMA/chloroform solution (60L droplet of 4% PMMA, bal. chloroform)
- Better transparency with core/triple-shell due to refractive index matching
- $n_{PMMA} = 1.48$, $n_{Gd_2O_3} = 1.95$, $n_{Y_2O_3} = 1.9$ and $n_{SiO_2} = 1.47$

- 1 vol% NPs in PMMA (60L drop-cast samples; $SiO_2$ shell not calcined)
- $n_{PMMA} = 1.48$, $n_{Gd_2O_3} = 1.95$, $n_{Y_2O_3} = 1.9$ and $n_{SiO_2} = 1.47$

INDEX OF REFRACTION MATCHED NANOPARTICLES AND METHODS OF USE

CROSS-REFERENCE TO RELATED APPLICATION

This application claims priority to U.S. provisional application entitled "INDEX OF REFRACTION MATCHED NANOPARTICLES AND METHODS OF USE," having Ser. No. 61/485,245, filed on May 12, 2011, which is entirely incorporated herein by reference.

STATEMENT OF GOVERNMENTAL SUPPORT

This invention was made with government support under grant number HDTRA1-08-1-0015, awarded by the Defense Threat Reduction Agency of the United States government. The government has certain rights in the invention.

BACKGROUND

Nanoparticles have been received significant attention over the last decade and have found use in many different types of materials. One type of nanoparticle that can produce a luminescent energy has found use in many areas where detection of the luminescent energy is advantageous. However, energy is often lost due to scattering and reflection of the photons. Thus, there is a need to reduce losses due to scattering and reflection.

SUMMARY

Embodiments of the present disclosure provide for luminescent materials, scintillating materials, radiation detection or measurement methods, radiation detectors, and the like.

In an embodiment, among others, the luminescent or scintillating material can include: a nanoparticle with a core having an index of refraction and at least one shell partially or totally enclosing the core, wherein when an additional shell is present, each partially or totally enclose the adjacent shell closest to the core, wherein each of the at least one shells has an index of refraction, wherein the shell enclosing the core has an index of refraction that is about 0.0001 to 50% different than the index of refraction of the core, wherein when one or more additional shells are present each will have an index of refraction that is about 0.0001 to 20% different than the adjacent shell closest to the core, wherein the outer most shell furthest away from the core has an index of refraction that is about 0.0001 to 10% different from that of the index of refraction of a matrix material in which the nanoparticle is dispersed.

In an embodiment, among others, the luminescent or scintillating material includes: two or more types of nanoparticles, with at least one type of nanoparticle having at least one shell that matches the index of refraction of the matrix, wherein the nanoparticle has a core having an index of refraction and at least one shell partially or totally enclosing the core, wherein when an additional shell is present, each partially or totally enclose the adjacent shell closest to the core, wherein each of the at least one shells has an index of refraction, wherein the shell enclosing the core has an index of refraction that is about 0.0001 to 50% different than the index of refraction of the core, wherein when one or more additional shells are present each will have an index of refraction that is about 0.0001 to 20% different than the adjacent shell closest to the core, wherein the outer most shell furthest away from the core has an index of refraction that is about 0.0001 to 10% different from that of the index of refraction of the matrix material.

In an embodiment, among others, the luminescent or scintillating material includes: a nanoparticle that has at least one shell that matches the index of refraction of the luminescent matrix, wherein the nanoparticle has a core having an index of refraction and at least one shell partially or totally enclosing the core, wherein when an additional shell is present, each partially or totally enclose the adjacent shell closest to the core, wherein each of the at least one shells has an index of refraction, wherein the shell enclosing the core has an index of refraction that is about 0.0001 to 50% different than the index of refraction of the core, wherein when one or more additional shells are present each will have an index of refraction that is about 0.0001 to 20% different than the adjacent shell closest to the core, wherein the outer most shell furthest away from the core has an index of refraction that is about 0.0001 to 10% different from that of the index of refraction of the luminescent matrix.

In an embodiment, among others, the radiation detection or measurement method includes: exposing a luminescent or scintillating material to a radiation energy, radioactive material, neutron, energetic particle, x-rays and gamma-rays, wherein the luminescent material includes a plurality of index of refraction matched nanoparticles in a matrix, wherein the radiation source causes luminescence in at least one type of nanoparticle, wherein the index of refraction of the outermost shell of the index of refraction matched nanoparticle is about 0.0001 to 10% different from that of the index of refraction of the matrix, wherein the nanoparticle has a core having an index of refraction and at least one shell partially or totally enclosing the core, wherein when an additional shell is present, each partially or totally enclose the adjacent shell closest to the core, wherein each of the at least one shells has an index of refraction, wherein the shell enclosing the core has an index of refraction that is about 0.0001 to 50% different than the index of refraction of the core, wherein when one or more additional shells are present each will have an index of refraction that is about 0.0001 to 20% different than the adjacent shell closest to the core, wherein the outer most shell furthest away from the core has an index of refraction that is about 0.0001 to 10% different from that of the index of refraction of the matrix; and detecting or measuring the luminescence or scintillation from the luminescent material.

In an embodiment, among others, the radiation detection or measurement method includes: exposing a luminescent or scintillating material to a radiation energy, radioactive material, neutron, energetic particle, x-rays and gamma-rays, wherein the luminescent material includes a plurality of index of refraction matched nanoparticles in a matrix, wherein the radiation source causes luminescence or scintillation of the matrix, wherein the index of refraction of the outermost shell of the index of refraction matched nanoparticle is about 0.0001 to 10% different from that of the index of refraction of the matrix, wherein the nanoparticle has a core having an index of refraction and at least one shell partially or totally enclosing the core, wherein when an additional shell is present, each partially or totally enclose the adjacent shell closest to the core, wherein each of the at least one shells has an index of refraction, wherein the shell enclosing the core has an index of refraction that is about 0.0001 to 50% different than the index of refraction of the core, wherein when one or more additional shells are present each will have an index of refraction that is about 0.0001 to 20% different than the adjacent shell closest to the core, wherein the outer most shell furthest away from the core has an index of refraction that is about 0.0001 to 10% different from that of the index of refraction of the matrix; and detecting or measuring the luminescence or scintillation from the luminescent material.

In an embodiment, among others, the radiation detection or measurement method includes: exposing a luminescent or scintillating material to a radiation energy, radioactive material, neutron, energetic particle, x-rays and gamma-rays, wherein the luminescent material includes a plurality of index of refraction matched nanoparticles of in a matrix, wherein the radiation source causes luminescence or scintillation of at least one type of nanoparticle and of the matrix, wherein the index of refraction of the outermost shell of the index of refraction matched nanoparticle is about 0.0001 to 10% different from that of the index of refraction of the matrix, wherein the nanoparticle has a core having an index of refraction and at least one shell partially or totally enclosing the core, wherein when an additional shell is present, each partially or totally enclose the adjacent shell closest to the core, wherein each of the at least one shells has an index of refraction, wherein the shell enclosing the core has an index of refraction that is about 0.0001 to 50% different than the index of refraction of the core, wherein when one or more additional shells are present each will have an index of refraction that is about 0.0001 to 20% different than the adjacent shell closest to the core, wherein the outer most shell furthest away from the core has an index of refraction that is about 0.0001 to 10% different than that of the index of refraction of the matrix; and detecting or measuring the luminescence or scintillation from the luminescent material.

In an embodiment, among others, the radiation detector includes: a structure comprising a luminescent or scintillating material, wherein the luminescent material includes a plurality of index of refraction matched nanoparticles of in a matrix, wherein the radiation source causes luminescence or scintillation of at least one type of nanoparticle, wherein the index of refraction of the outermost shell of the index of refraction matched nanoparticles is about 0.0001 to 10% different from that of the index of refraction of the matrix; and a photodetector and its electronics and power supply to detect or measure the luminescence or scintillation from the index of refraction matched nanoparticles, wherein the nanoparticle has a core having an index of refraction and at least one shell partially or totally enclosing the core, wherein when an additional shell is present, each partially or totally enclose the adjacent shell closest to the core, wherein each of the at least one shells has an index of refraction, wherein the shell enclosing the core has an index of refraction that is about 0.0001 to 50% different than the index of refraction of the core, wherein when one or more additional shells are present each will have an index of refraction that is about 0.0001 to 20% different than the adjacent shell closest to the core, wherein the outer most shell furthest away from the core has an index of refraction that is about 0.0001 to 10% different from that of the index of refraction of the matrix.

In an embodiment, among others, the radiation detector includes: a structure comprising a luminescent or scintillating material, wherein the luminescent material includes a plurality of index of refraction matched nanoparticles in a matrix, wherein the radiation source causes luminescence or scintillation of the matrix, wherein the index of refraction of the outermost shell of the index of refraction matched nanoparticles is about 0.0001 to 10% different from that of the index of refraction of the matrix; and a photodetector and its electronics and power supply to detect or measure the luminescence or scintillation from the index of refraction matched nanoparticles, wherein the nanoparticle has a core having an index of refraction and at least one shell partially or totally enclosing the core, wherein when an additional shell is present, each partially or totally enclose the adjacent shell closest to the core, wherein each of the at least one shells has an index of refraction, wherein the shell enclosing the core has an index of refraction that is about 0.0001 to 50% different than the index of refraction of the core, wherein when one or more additional shells are present each will have an index of refraction that is about 0.0001 to 20% different than the adjacent shell closest to the core, wherein the outer most shell furthest away from the core has an index of refraction that is about 0.0001 to 10% different from that of the index of refraction of the matrix.

In an embodiment, among others, the radiation detector includes: a structure comprising a luminescent or scintillating material, wherein the luminescent material includes a plurality of index of refraction matched nanoparticles of in a matrix, wherein the radiation source causes luminescence or scintillation of the matrix and at least one type of nanoparticle, wherein the index of refraction of the outermost shell of the index of refraction matched nanoparticles is about 0.1 to 10% different from that of the index of refraction of the matrix; and a photodetector and its electronics and power supply to detect or measure the luminescence or scintillation from the index of refraction matched nanoparticles, wherein the nanoparticle has a core having an index of refraction and at least one shell partially or totally enclosing the core, wherein when an additional shell is present, each partially or totally enclose the adjacent shell closest to the core, wherein each of the at least one shells has an index of refraction, wherein the shell enclosing the core has an index of refraction that is about 0.0001 to 50% different than the index of refraction of the core, wherein when one or more additional shells are present each will have an index of refraction that is about 0.0001 to 20% different than the adjacent shell closest to the core, wherein the outer most shell furthest away from the core has an index of refraction that is about 0.0001 to 10% different from that of the index of refraction of the matrix.

BRIEF DESCRIPTION OF THE DRAWINGS

Many aspects of the disclosed devices and methods can be better understood with reference to the following drawings. The components in the drawings are not necessarily to scale, emphasis instead being placed upon clearly illustrating the relevant principles. Moreover, in the drawings, like reference numerals designate corresponding parts throughout the several views.

DETAILED DESCRIPTION

Figure 1A:
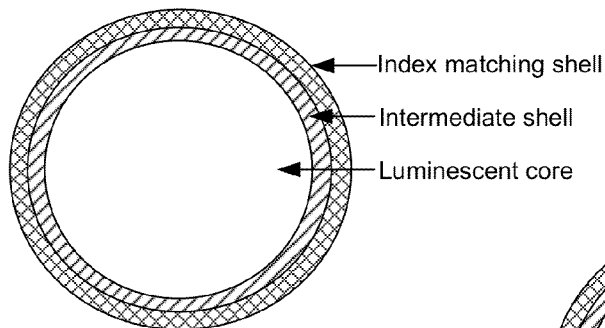
FIGS. 1A to 1C illustrate embodiments of the present disclosure.

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Embodiments of the present disclosure will employ, unless otherwise indicated, techniques of material science, chemistry, physics, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, dimensions, frequency ranges, applications, or the like, as such can vary. It is also to be understood that the terminology used herein is for purposes of describing particular embodiments only, and is not intended to be limiting. It is also possible in the present disclosure that steps can be executed in different sequence, where this is logically possible. It is also possible that the embodiments of the present disclosure can be applied to additional embodiments involving measurements beyond the examples described herein, which are not intended to be limiting. It is furthermore possible that the embodiments of the present disclosure can be combined or integrated with other measurement techniques beyond the examples described herein, which are not intended to be limiting.

It should be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Each of the applications and patents cited in this text, as well as each document or reference cited in each of the applications and patents (including during the prosecution of each issued patent; "application cited documents"), and each of the PCT and foreign applications or patents corresponding to and/or claiming priority from any of these applications and patents, and each of the documents cited or referenced in each of the application cited documents, are hereby expressly incorporated herein by reference. Further, documents or references cited in this text, in a Reference List before the claims, or in the text itself; and each of these documents or references ("herein cited references"), as well as each document or reference cited in each of the herein-cited references (including any manufacturer's specifications, instructions, etc.) are hereby expressly incorporated herein by reference.

Prior to describing the various embodiments, the following definitions are provided and should be used unless otherwise indicated.

DEFINITIONS

The terms "quantum dot" (QD) and "nanoparticle" (NP) are used interchangeably herein. Both terms refers to semiconductor or insulator nanoparticle with or without one or more dopants. When doped with more than one dopant, the nanoparticle is sometimes called "co-doped". These nanoparticles are also known as nanocrystals, or artificial atoms, which are crystals that contain about 100 to 500,000 atoms or have a diameter of about 1-250 nm. In an embodiment, NP can be a sphere having a diameter of about 1-250 nm. In an embodiment, NP can be a nanorod with diameters of about 1-100 nm and lengths between about 2× and 1000× the diameter. In an embodiment, NP can be luminescent, i.e., emits electromagnetic radiation commonly UV or within the visible spectrum upon stimulation e.g., from a light source of appropriate wavelength, or from ionizing radiation, or neutrons. Scintillation can be understood as the generation of UV or visible light due to irradiation of ionizing radiation, or neutrons. The terms "luminescent" and "scintillation" and other related terms are used interchangeably herein. In an embodiment, NPs are non-luminescent and the matrix containing the NPs is luminescent. In an embodiment, there is more than one type of NP. In an embodiment, at least one type of NP and the matrix is luminescent. The shape of the NP may be complex, such as platelets, faceted particles, cylinders, tetrapods, stars, and the like. Luminescent NPs may have high photon quantum yields, which makes them particularly useful for optical applications. Semiconductor NPs are fluorophores that fluoresce by forming excitons, which can be thought of as the excited state of traditional fluorophores, but may have much longer lifetimes of up to about 200 nanoseconds. This property provides NPs with low photobleaching. Doped insulators fluoresce by recombination of charge carrier at the dopant atom and exhibit lifetimes of less than 1 nanosecond to greater than 5 milliseconds. Rather than luminesce directly, one or more dopants can also be added to compensate charge imbalance due to other dopants or defects, and/or to promote energy transfer to the luminescent center. The energy level of the quantum states of NPs with dimensions less than the Bohr radius can be controlled by changing the size and shape of the NP and the depth of the NPs' potential, and are called quantum dots (QDs). One of the optical features of semiconductor excitonic NPs is coloration, which is determined by the size and composition of the QD. As the dimension of the QD increases approaching the Bohr radius, the color is red-shifted, i.e. exhibits a longer wavelength of the fluorescence. The smaller QD's with dimensions less than the Bohr radius may exhibit a blue-shift towards shorter fluorescence wavelength. The magnitude of the bandgap (in some cases less the excitonic binding energy) determines the energy and hence the color of the fluoresced light. For NP's less than the Bohr radius, the bandgap is inversely proportional to the square of the size of the semiconductor NP. For doped insulators and semiconductors with larger radii, the color of the fluoresced light is equal to the difference between ground and/or lower level excited quantum states and upper level excited states of the dopant(s) that may or may not be a function of the NP size. Larger NPs have more closely spaced energy levels, thus allowing the NP to absorb photons with lower energy, e.g., photons with longer wavelengths.

As mentioned above, NPs can include, but are not limited to, luminescent semiconductor QDs. In general, NP's include a core material and a capping (also called a shell) material, however, uncapped NP's can be used as well. The "core" is a semiconductor or doped or undoped insulator nanoparticle with dimensions of about 1 to 250 nm. While any core of the IIB-VIA, IIIA-VA, or IVA-IVA, IVA-VIA, IB-IIIA-VIA semiconductors or doped or undoped insulator can be used in the context of the present disclosure, the core may or may not be a luminescent NP, whose luminance may be increased by a capping layer. A IIB-VIA semiconductor is a compound that contains at least one element from Group IIB and at least one element from Group VIA of the periodic table, and so on. The core can include two or more elements. In an embodiment, the core of the nanoparticles can also be a transition metal oxide or lanthanide metal oxide NP doped with rare earth or transition metal ions, or a combination thereof. In another embodiment, the core of the NP is a Group IA or IIA or solid solutions between Group IA elements, Group IIA elements, and combination thereof, or lanthanide metals bound to a Group VIIA halide with or without a dopant, particularly rare earth ions and transition metal ions, Ce-doped Lu, Y and Gd oxyorthosilicates, Ce-doped oxyorthosilicates made with a combination of at least two of the elements Y, Lu and Gd, Ce-doped Sr or Ba hafanate, or alloys such as $Lu_{2x}Gd_{2(1-x)}SiO_5$:Ce or $Ce_xLa_{1-x}F_3$ (x is variable from about one to zero). In one embodiment, the core is an IIB-VIA, IIIA-VA, or IVA-IVA semiconductor that can be about 1 nm to 40 nm, about 1 nm to 30 nm, about 1 nm to 20 nm, or about 1 nm to 10 nm in diameter. In another embodiment, the core can be an IIB-VIA semiconductor and can be about 2 nm to 10 nm in diameter. For example, the core can be CdS, CdSe, CdTe, ZnSe, ZnS, ZnS:Ag, ZnO:Ag, PbS, PbSe, or an alloy such as $Cd_xZn_{1-x}Se_yTe_{1-y}$, where x is a variable from one to zero and y is variable from about one to zero. In an embodiment the core is CdTe.

The "cap" or "shell" may be a semiconductor or insulator that differs from or is the same as the semiconductor or insulator of the core and binds to the core, thereby forming a surface layer on the core. A shell can differ from the core and/or other shells by means of its chemical composition, and/or the presence of one or more dopants, and/or different amounts of a given dopant. The shell typically passivates the core by having a higher band gap than the core, and having an energy offset in the top of the valence band and bottom of the conduction band such that electrons and/or holes may be confined to the core by the shell. Each shell encloses, partially (e.g., about 50% or more, about 60% or more, about 70% or more, about 80% or more, about 90% or more, about 95% or more, about 99% or more) or totally, the adjacent shell closer to the core. In one embodiment, the shell can be a IIB-VIA semiconductor of high band gap. For example, the shell can be ZnS or CdS on a core of $CdSe_yTe_{1-y}$ (y is variable from about one to zero). Other combinations of the core and shell can include, but are not limited to, the shell is ZnS when the core is CdSe or CdS, and the shell is CdS when the core is CdSe. In an embodiment, the shell may also be an organic film, such as silicones, thiophenes, trioctylphosphine, trioctylphosphine oxide, or a combination thereof. Other exemplary NP's include, but are not limited to, CdS, ZnSe, ZnS: Ag, ZnS:Cu, ZnO, CdSe, CdTe, $CdSe_xTe_{1-x}$ (x is variable from about one to zero), InAs, InP, PbTe, PbSe, PbS, HgS, HgSe, HgTe, CdHgTe, and GaAs. The thickness of the shell can be about 0.1 to 20 nm, about 0.1 to 5 nm, or about 0.1 to 2 nm covering the core. In an embodiment, the shell is CdSe. The shells can be of doped or undoped insulators, or a combination of semiconductor and doped and undoped insulators, including but not limited to $CeF_3$, $CeBr_3$, $LaBr_3$, $CaF_2$:Eu, $BaF_2$:Ce, $LaF_3$ doped with one or more lanthanide ions, Ce-doped Lu, Y and Gd oxyorthosilicates, Ce-doped oxyorthosilicates made with a combination of at least two of the elements Y, Lu and Gd, Ce-doped Sr or Ba hafanate, or alloys such as $Cd_xZn_{1-x}Se_yTe_{1-y}$, or $Lu_{2x}Gd_{2(1-x)}SiO_5$:Ce or $Ce_xLa_{1-x}F_3$ (x and y are variable from about one to zero). The core may also be a transition metal or lanthanide metal oxide, nitride, halide, or oxynitride such as LiF, LiCl, $Li_2O$, $PbF_2$, $PbCl_2$, Pb oxide, $Bi_2O_3$, $BiF_3$, $BiCl_3$, $CeF_3$, $CeBr_3$, $LaBr_3$, $CaF_2$:Eu, $BaF_2$:Ce, $LaF_3$ doped with lanthanide ions, $V_2O_3$, $Y_2O_3$, $Gd_2O_3$, doped with a lanthanide ion or undoped, Ce-doped Lu, Y or Gd oxyorthosilicate, Ce-doped Sr or Ba hafanate, $Lu_{2x}Gd_{2(1-x)}SiO_5$:Ce, $Ce_xLa_{1-x}F_3$ (x is variable from about one to zero). In another embodiment, the core may be an alkali halide, such as NaI doped with Tl, or alkaline earth halide, such as $CaF_2$ or $BaF_2$, without a dopant or with a lanthanide ion dopant, such as Eu or Ce.

The wavelength of the light emitted (e.g., color) by the QDs can be selected according to the physical properties of the NP's, such as the size, the material of the nanocrystal, and the dopant. Nanoparticles are known to emit light from about 200 nanometers (nm) to 2000 nm (e.g., UV, visible, near IR, and IR). The colors of the nanoparticles include, but are not limited to, UV, red, blue, violet, green, and combinations thereof. The color or the fluorescence emission wavelength of semiconductor QDs with a size less than the Bohr radius can be tuned continuously. The wavelength band of light emitted by the NP's may be determined by either the size of the core or the size of the core and shell, depending on the materials that make up the core and shell. The emission wavelength band can be tuned by varying the composition and the size of the NP and/or adding one or more shells around the core in the form of concentric shells. In the case of doped insulators, the color of emitted light is generally independent of the size of the quantum dot, and is mostly related to the nature of the dopant and host. However the excitation wavelength for photoluminescence may depend upon the size of the quantum dot. Frequently the quantum dot may contain intrinsic point defects and defect complexes that are optically active and result in emitted light. Emission from point defects and complexes may be influenced by the quantum dot size.

The term "nanoparticle" includes crystals with dimensions of about 1 and 250 nm (in diameter or length of the longest dimension), with spherical or more complex shapes such as platelets, faceted particles, cylinders, tetrapods, stars, etc. An embodiment of the nanoparticle can include, but are not limited to, semiconductor or doped insulator nanocrystals or undoped insulator nanocrystals. In an embodiment, the nanoparticles may have no shell, when they are sometimes called "core", or may have one or more shells, with the outer shell partially or entirely enclosing the adjacent shell closest to the core. The core and shells can have the same composition, or have different compositions, including luminescent and non-luminescent materials, and a combination thereof. The composition of the core and shells may differ by the presence or absence of one or more dopants and/or by the amount of the dopants. In an embodiment, the dopants can be, but are not limited to, lanthanides and transition metal ions, and a combination thereof. For example, nanoparticle can be, CdS, CdSe, CdTe, ZnSe, ZnS, ZnS:Ag, ZnO:Ag, PbS, PbSe, LiF, LiCl, $PbF_2$, $PbCl_2$, Pb oxide, $BiF_3$, $BiCl_3$, $Bi_2O_3$, $Li_2O$, $CeF_3$, $CeBr_3$, $LaBr_3$, $CaF_2$:Eu, $BaF_2$:Ce, $LaF_3$ doped with one or more lanthanide ions, Ce-doped Lu, Y and Gd oxyorthosilicates, Ce-doped oxyorthosilicates made with a combination of at least two of the elements Y, Lu and Gd, Ce-doped Sr or Ba hafanate, or alloys such as $Cd_xZn_{1-x}Se_yTe_{1-y}$, $Lu_{2x}Gd_{2(1-x)}SiO_5$:Ce, or $Ce_xLa_{1-x}F_3$ (x and y are variable from about one to zero). The nanoparticles can be non-luminescent or luminescent. Luminescent NPs may have high quantum yields, which make them particularly useful for optical applications.

The terms "matrix" and "host" are used interchangeably herein. The matrix can typically be a polymer, glass, and particularly a glass with low melting point, or crystalline ceramic with an index of refraction between about 1.3 and 5. Non-limiting examples of a polymeric matrix are silicones, polystyrene, poly(methyl methacrylate) (PMMA), or polyvinyl toluene (PVT), and may contain about 10% or less of, but not limited to, conjugated and aromatic organic molecules, 1,4-bis-2-(5-phenyloxazol-2-yl)benzene (POPOP), 1,4-bis (4-methyl-5-phenyloxazol-2-yl)benzene (DM-POPOP) 2-(4-biphenylyl)-5-phenyl-1,3,4-oxadiazole (PBD), 2-(4-biphenylyl)-5-(4-tert-butylphenyl)-1,3,4-oxadiazole (butyl-PBD),2-(4-biphenylyl)-6-phenylbenzoxazole (PBBO), 2-(1-napthyl)-5-phenyloxazole("alpha"-NPO), 1,4-bis(2-methylstyryl)benzene (bis-MSB), 2,5-bis(5-tert-butyl-2-benzoxazolyl)thiophene (BBOT), p-terphenyl, 2,7-diphenyl-9,9-dipropylfluorene (PPF), 2,7-bis(4-t-amylphenyl)-9,9-dipropylfluorene (d-amyl-PPF), 2,7-bis(4-methoxyphenyl)-9,9-dipropylfluorene (d-MeO-PPF), 7,7-diphenyl-9,9,9',9'-tetrapropy-2,2'-bifluorene (PF2), naphthalene, 2,5-Diphenyloxazole (PPO or DPO), anthracene, stilbene, or a combination thereof.

Discussion

Embodiments of the present disclosure provide for nanoparticles, methods of making nanoparticles, materials including nanoparticles, the use of materials including nanoparticles, and the like. In an embodiment, the nanoparticle includes a core that has luminescent properties and one or more inorganic and/or organic shells disposed around the core. In another embodiment, the nanoparticle includes a core that does not have luminescent properties and has at least one luminescent shell enclosing the core as well as one or more shells disposed around the core. In a third embodiment, the nanoparticles include a luminescent core with one or more luminescent shells and one or more non-luminescent shells. In a fourth embodiment, the nanoparticles are not luminescent, but the matrix is luminescent. In a fifth embodiment, there is more than one type of nanoparticle, with at least one type of nanoparticle being luminescent, either from the core, or the shell, or a combination thereof, and the other types of nanoparticles being non-luminescent. In a sixth embodiment, only the matrix is luminescent, and at least one type of nanoparticles is index matched with the matrix. In a seventh embodiment, the matrix and at least one type of the nanoparticle are luminescent, and at least one type of nanoparticle is non-luminescent, and at least one type of nanoparticle is index matched with the matrix. In an eighth embodiment, at least one type of nanoparticle is index matched with the matrix, and at least one type of nanoparticle is less than about 20 nm in diameter to limit light scattering. In an additional embodiment, the nanoparticles may have a ligand bonded to them to enhance dispersion in a host, particularly a polymeric host.

Embodiments of the present disclosure also provide for the detection and measurement of radiation, comprising a luminescent material made with index of refraction matched nanoparticles in a matrix, and detection of luminescence from these materials, and for a radiation detector comprising a luminescent material made with index of refraction matched nanoparticles in a matrix and a photodetector and its pertinent electronics and power supply to detect the luminescence and/or scintillation of these materials.

In each of the embodiments, in at least one type of nanoparticle the outermost shell of the NP's has a similar index of refraction as the host or matrix material that contains the nanoparticle, while other nanoparticles may be smaller than about 20 nm to limit the magnitude and direction of light scattering, allowing higher volume percentage of NP loading before significantly reducing transparency. In other words, embodiments of the present disclosure match the index of refraction of the outer shell of the nanoparticle with the matrix material of at least one type of nanoparticle, when the core has a different index of refraction than the matrix material. The index of refraction of the NP's matches the index of the matrix when the difference is less than about 0.1. Matching the index of refraction is advantageous because it reduces the scattering and reflection of light at the interface between the nanoparticle and the matrix, thus enhancing optical transparency. The shell(s) may also simultaneously reduce the density of defect states present on the surface of the core or surface of luminescent shells. These defects may reduce the luminance of the nanoparticles. Each shell may have more than one function, like in the following non-limiting examples, it may be doped to adjust the index of refraction and simultaneously be a luminescent and/or scintillating material. A shell may also serve to limit or eliminate atomic diffusion between the interior part of the nanoparticle and the exterior part of the nanoparticle upon thermal treatment. A shell may also serve to promote chemical stability of the interior part of the nanoparticle by isolating the interior core and shells from direct exposure to the environment. All, some, or none of these functions may be present in a single shell, in addition to the function of adjusting the index of refraction. None, one, or more multi-function shells may be present in a nanoparticle. Addition of multiple shells may allow for the gradual alteration of the index of refraction of the nanoparticle from that of the core to an outer shell that matches the index of the matrix. Since the probability of scattering and reflection is proportional to the difference in the optical index across an interface, smaller changes in index at interfaces lead to less scattering and reflection. Making gradual adjustments in the index of refraction for each shell allows the engineering of the nanoparticles with a smaller mismatch of the index of refraction across all interfaces, including that with the matrix material. Embodiments of the present disclosure may have increased transparency and/or translucency, increased luminance relative to the luminescent cores without the shells due to decreased scattering and reflection of the radiation caused by unmatched indices of refraction, as well as reduced density of surface states that lead to non-radiative relaxation of excitons or excited states. Reducing the scattering of the emitted radiation can be considered when nanoparticles of the present disclosure are used in scintillation radiation detectors or the like. The advantages of the present disclosure may allow the use of or the increased use of, embodiments of the present disclosure in technologies such as scintillators for radiation detection and measurement, LEDs, displays, and solar cells.

Figure 1B:
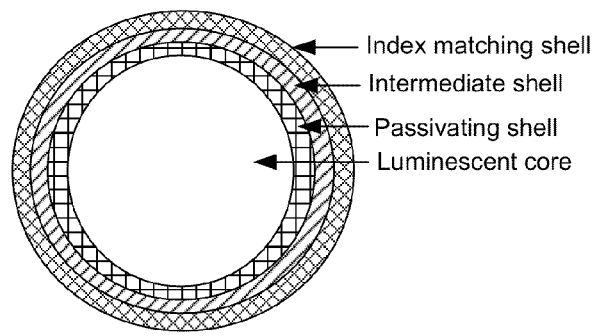

As mentioned above, an embodiment of the present disclosure includes a nanoparticle that includes a core that has luminescent properties (e.g., emits radiation upon stimulation e.g., from a light source of appropriate wavelength, or from ionizing radiation, or neutrons) and one or more shells disposed around the core. In particular, the core is enclosed by at least one shell. In another embodiment, it includes a non-luminescent nanoparticle and one or more shells disposed around the core. In another embodiment, it includes combinations of nanoparticles where some have shells and others do not have shells. In an embodiment, the nanoparticle can have one shell. In an embodiment, the nanoparticle can have 2 to 10 shells or 2 to 4 shells. For any additional shells that are present, each shell encloses, partially or totally, the adjacent shell closest to the core (See FIGS. 1A and 1B). The core has an index of refraction and each of the shells present has an index of refraction. The difference in the index of refraction of the shell and the enclosed core is about 0.0001 to 50% or about 0.0001 to 2.5% (and smaller ranges there between (e.g., increments of 0.0001)). In an embodiment, the difference in the index of refraction of the shell and the enclosed core is about 1 to 7% or about 1.4 to 6.2% (and smaller ranges there between (e.g., increments of 0.0001)). For any additional shells that are present, each can have an index of refraction that is different by about 0.0001 to 30% or about 0.0001 to 2.5% (and smaller ranges there between (e.g., increments of 0.0001)) than the adjacent shell closest to the core. In an embodiment, for any additional shells that are present, each can have an index of refraction that is different by about 1 to 7% or about 1.4 to 6.2% (and smaller ranges there between (e.g., increments of 0.0001)). The outer most shell furthest away from the core has an index of refraction that is different from the index of refraction of a matrix material containing the nanoparticle by about 0.1 to 10% (and smaller ranges there between (e.g., increments of 0.0001)). In an embodiment, the outer most shell furthest away from the core has an index of refraction that is different from the index of refraction of a matrix material containing the nanoparticle by about 1 to 7% or about 1.4 to 6.2% (and smaller ranges there between (e.g., increments of 0.0001)). The nanoparticle can have a diameter of about 3 to 250 nm, which depends upon the diameter of the core and the number and thickness of shells.

The following discussion describes exemplar representative embodiments of the present disclosure.

In an embodiment, the matrix can be made of silicones, polystyrene, poly(methyl methacrylate) (PMMA), or polyvinyl toluene (PVT), and may contain about 10% or less of, but not limited to, conjugated and aromatic organic molecules, 1,4-bis-2-(5-phenyloxazol-2-yl)benzene (POPOP), 1,4-bis (4-methyl-5-phenyloxazol-2-yl)benzene (DM-POPOP) 2-(4-biphenylyl)-5-phenyl-1,3,4-oxadiazole (PBD), 2-(4-biphenylyl)-5-(4-tert-butylphenyl)-1,3,4-oxadiazole (butyl-PBD),2-(4-biphenylyl)-6-phenylbenzoxazole (PBBO), 2-(1-napthyl)-5-phenyloxazole("alpha"-NPO), 1,4-bis(2-methylstyryl)benzene (bis-MSB), 2,5-bis(5-tert-butyl-2-benzoxazolyl)thiophene (BBOT), p-terphenyl, 2,7-diphenyl-9,9-dipropylfluorene (PPF), 2,7-bis(4-t-amylphenyl)-9,9-dipropylfluorene (d-amyl-PPF), 2,7-bis(4-methoxyphenyl)-9,9-dipropylfluorene (d-MeO-PPF), 7,7-diphenyl-9,9,9',9'-tetrapropy-2,2'-bifluorene (PF2), naphthalene, 2,5-Diphenyloxazole (PPO or DPO), anthracene, stilbene, or a combination thereof.

In an embodiment, the nanoparticle includes a core having a first index of refraction and a first shell enclosing the core. The first shell has a second index of refraction that is different than the first index of refraction of the core. The difference in the first index of refraction and the second index of refraction is about 0.0001 to 50% of the index of refraction of the core. The second index of refraction is different by about 5% from that of the index of refraction of a matrix material in which the nanoparticles are incorporated.

In another embodiment, a nanoparticle includes a core having a first index of refraction, a first shell enclosing the core, and a second shell enclosing the first shell. The first shell has a second index of refraction that is different than the first index of refraction of the core. The second shell has a third index of refraction that is different than the second index of refraction. The difference in the first index of refraction and the second index of refraction is about 0.0001 to 50%. The difference in the second index of refraction and the third index of refraction is less than about 10%. The difference of the third index of refraction is about 2.5% from that of the index of refraction of a matrix material that includes the nanoparticle.

In one embodiment, the index of refraction monotonically increases from the core to the outermost shell to match the index of refraction of the host. In another embodiment, the index of refraction monotonically decreases from the core to the outermost shell to match the index of refraction of the host.

In another embodiment, a nanoparticle includes a core having a first index of refraction, a first shell enclosing the core, a second shell enclosing the first shell, and a third shell enclosing the second shell. The first shell has a second index of refraction that is different than the first index of refraction of the core. The second shell has a third index of refraction that is different than the second index of refraction. The third shell has a fourth index of refraction that is different than the third index of refraction. The difference in the first index of refraction and the second index of refraction is about 0.0001 to 50%. The difference in the second index of refraction and the third index of refraction is about 0.0001 to 20%. The difference in the third index of refraction and the fourth index of refraction is about 0.0001 to 10%. The fourth index of refraction is about 0.0001 different from that of the index of refraction of a matrix material in which the nanoparticles are incorporated.

In another embodiment, a nanoparticle includes a core having a first index of refraction, a first shell enclosing the core, a second shell enclosing the first shell, a third shell enclosing the second shell, and a fourth shell enclosing the third shell. The first shell has a second index of refraction that is different than the first index of refraction of the core. The second shell has a third index of refraction that is different than the second index of refraction. The third shell has a fourth index of refraction that is different than the third index of refraction. The fourth shell has a fifth index of refraction that is different than the fourth index of refraction. The difference in the first index of refraction and the second index of refraction is about 0.0001 to 50%. The difference in the second index of refraction and the third index of refraction is about 0.0001 to 10%. The difference in the third index of refraction and the fourth index of refraction is about 0.0001 to 10%. The difference in the fourth index of refraction and the fifth index of refraction is about 0.0001 to 10%. The fifth index of refraction is about 2.5% of that of the index of refraction of a host material in which the nanoparticle is incorporated.

In any of the embodiments noted directly above, any one or more of the cores, or shells can be luminescent or may not be luminescent.

A combination of nanoparticles described in the above embodiments can be used in further embodiments. In these further embodiments, the nanoparticles can differ from one another by means of at least one characteristic, including, but not limited to, the composition, presence, absence and amount of dopants, and number of shells. Moreover, the embodiments can also differ from one another by the nature and/or composition of the matrix containing the nanoparticles, and/or the relative amounts of the different types of nanoparticles.

In an embodiment, the core is made of a luminescent material such as IIB-VIA, IIIA-VA, IVA-IVA or IB-IIIA-VIA semiconductor nanocrystals, doped or undoped transition metal oxides, nitrides, oxynitrides; doped or undoped lanthanide metal oxides, halides, nitrides, or oxynitrides, oxyhalides, Ce-doped Lu, Y or Gd oxyorthosilicate, Ce-doped oxyorthosilicates made up with combinations of at least two of the elements Lu, Y and Gd, Ce-doped Sr and Ba hafanates, doped or undoped alkali or alkaline earth halides and their solid solutions, and alloys such as $Lu_{2x}Gd_{2(1-x)}SiO_5$:Ce, or $Ce_xLa_{1-x}F_3$ (x is variable from about one to zero). In an embodiment, the semiconductor nanocrystal is a QD as described herein. The luminescent material can emit radiation having a wavelength of about 200 nm to 5000 nm.

In another embodiment, the core is made of a non-luminescent material like any one or more of the following: $PbF_2$, $PbCl_2$, LiF, LiCl, $Li_2O$, $BiF_3$, $BiCl_3$, Pb oxide, and/or $Bi_2O_3$ and the matrix is made of silicones, polystyrene, poly(methyl methacrylate) (PMMA), or polyvinyl toluene (PVT) and may contain about 10% or less of, but not limited to, conjugated and aromatic organic molecules, 1,4-bis-2-(5-phenyloxazol-2-yl)benzene (POPOP), 1,4-bis(4-methyl-5-phenyloxazol-2-yl)benzene (DM-POPOP) 2-(4-biphenylyl)-5-phenyl-1,3,4-oxadiazole (PBD), 2-(4-biphenylyl)-5-(4-tert-butylphenyl)-1,3,4-oxadiazole (butyl-PBD),2-(4-biphenylyl)-6-phenylbenzoxazole (PBBO), 2-(1-napthyl)-5-phenyloxazole ("alpha"-NPO), 1,4-bis(2-methylstyryl)benzene (bis-MSB), 2,5-bis(5-tert-butyl-2-benzoxazolyl)thiophene (BBOT), p-terphenyl, 2,7-diphenyl-9,9-dipropylfluorene (PPF), 2,7-bis(4-t-amylphenyl)-9,9-dipropylfluorene (d-amyl-PPF), 2,7-bis(4-methoxyphenyl)-9,9-dipropylfluorene (d-MeO-PPF), 7,7-diphenyl-9,9,9',9'-tetrapropy-2,2'-bifluorene (PF2), naphthalene, 2,5-Diphenyloxazole (PPO or DPO), anthracene, stilbene, and a combination thereof. In another embodiment the NP core is non-luminescent, but at least one of the shells is luminescent. In another embodiment, the luminescent material contains at least two types of nanoparticles, with at least one type having at least one shell to match the index of refraction of the matrix, as for a non-limiting example, $PbF_2$ nanoparticles and $CaF_2$:Eu/$CaF_2$:Pr core/shell nanoparticles matching the index of refraction of the polymethylmethacrylate (PMMA) matrix.

As mentioned above, each of the layers has an index of refraction that is different than the index of refraction of the adjacent shell closest to the core by about 0.0001 to 50% or about 0.0001 to 2.5%. The index of refraction can be about 1.3 to 5 for the nanoparticles and/or shells. The matrix can be a polymer, glass, and particularly a glass with low melting point, or crystalline ceramic with an index of refraction between about 1.3 and 5. Non-limiting examples of a polymeric matrix are silicones, PMMA, polystyrene and polyvinyl toluene (PVT). In an embodiment, it is contemplated that the two or more adjacent shells can have the same index of refraction. In an embodiment, the shells can be made of different types of material or the same material but the material contains different levels of dopant, where the doping concentration is selected to match the index of refraction of the nanoparticle with the matrix material. In an embodiment where multiple shells are used, the combination of shells can include shells made of different materials and two or more layers with the same material but differentially doped. In an embodiment, all shells are made of different materials, while in another embodiment, all the shells are made of the same material but each shell has a different dopant or level of doping for the same dopant. In an additional embodiment, some shells are of the same material differing by the presence and amount of the dopants, while the remaining shells are of different materials.

The shells for semiconductor cores can be made of materials such as, but not limited to, CdS, ZnS, ZnS:Ag, ZnO:Ag, $SiO_2$, $Al_2O_3$, $Y_2O_3$, $Gd_2O_3$, $Bi_2O_3$, BaO, $BiF_3$, $BiCl_3$, Pb oxide, $PbCl_2$, $PbF_2$ and a combination thereof. For oxide nanoparticles cores, shells can be made of materials such as, but not limited to, $SiO_2$, $Y_2O_3$, $Gd_2O_3$, $Al_2O_3$, $Bi_2O_3$, $BiF_3$, $BiCl_3$, Pb oxide, BaO, $PbF_2$, $PbCl_2$, Ce-doped Lu, Y or Gd oxyorthosilicate, Ce-doped oxyorthosilicates made up with combinations of at least two of the elements Lu, Y and Gd, Ce-doped Sr and Ba hafanates, doped or undoped alkali or alkaline earth halides and their solid solutions, and alloys such as $Lu_{2x}Gd_{2(1-x)}SiO_5$:Ce, or $Ce_xLa_{1-x}F_3$ (x is variable from about one to zero), and a combination thereof. For alkali or alkaline earth halide cores, shells can be made of materials such as (but not limited to) $SiO_2$, $Y_2O_3$, $Bi_2O_3$, $Gd_2O_3$, $CaF_2$, $BaF_2$, $PbF_2$, $PbCl_2$, $BiF_3$, $BiCl_3$, Pb oxide, $GdF_3$, Ce-doped Lu, Y or Gd oxyorthosilicate, Ce-doped oxyorthosilicates made up with combinations of at least two of the elements Lu, Y and Gd, Ce-doped Sr and Ba hafanates, doped or undoped alkali or alkaline earth halides and their solid solutions, and alloys such as $Lu_{2x}Gd_{2(1-x)}SiO_5$:Ce, or $Ce_xLa_{1-x}F_3$ (x is variable from about one to zero), or a combination thereof. As discussed above, each shell can be made of the same material but doped to different degrees. For example, doped materials in each shell can include an increasing or decreasing amount of dopant in the material as a function of the shell to achieve the desired index of refraction of the outermost shell that is in contact with the matrix material. The dopants that can be used in one or more of the materials described herein can include, but not limited to, Li, Ce, Pr, Nd, Sm, Eu, Gd, Tb, Dy, Ho, Er, Tm, Yb, Lu, V, Mn, Cr, Fe, and a combination thereof. For semiconductor shells, doping with Ce, Eu, Er, Tm, or combinations thereof, are more common. For lanthanide or transition metal oxides, all of the above dopants are used. For alkali and alkaline earth halides, doping with Ce, Nd, Eu, Er, or combinations thereof, are more commonly used.

The core can have a diameter of about 1 to 250 nm or about 10 to 60 nm. Each of the shells can individually have a thickness of about 1 to 30 nm or about 1 to 10 nm. The shell or shells may be continuous around the core, or may be in the form of islands on the core, with continuous distribution being preferred. The shape of the core may be spherical, rod-like, platelets, tetrapods, or more complex shapes. Selection of the materials for the shell or shells may be based on the ability of the shell material to suppress non-radiative relaxation and provide a small change (increase or decrease) in the index of refraction, as defined above. The material of the core or shell or shells may also be chosen to promote specific absorption or capture of radiation such as x-rays, gamma-rays, alpha particles and neutrons. As a non-limiting example, a material containing Li or B or Gd, or a combination thereof, with the natural abundance of their isotopes or isotope enriched, can be used to capture neutrons. In another example, materials containing Pb and/or Bi can be used to absorb x-rays and gamma-rays.

In an embodiment, the nanoparticles can be made by any of the well-known methods to synthesize nanoparticles. These methods include the so-called 'bottom up' methods such as colloidal growth, sol gel, solution precipitation, hot solution growth, hydrothermal, solvothermal, microemulsion, solution combustion, competitive chemical reaction, and a combination thereof, and so forth. The synthesis methods may also include the so-called 'top down' processes such as island growth and self-assembly processes from thin films grown by techniques including but not limited to molecular beam epitaxy (MBE), metallo-organic chemical vapor deposition (MOCVD), chemical vapor deposition (CVD), plasma enhanced processes, and so forth.

Figure 1C:
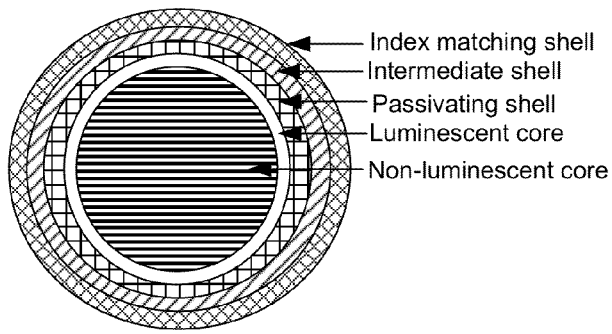

Now referring to an embodiment of the present disclosure that includes a non-luminescent core, the nanoparticle includes a core, a luminescent shell enclosing the core, and at least one shell disposed around the luminescent shell. In particular, the luminescent shell is enclosed by at least one shell. In an embodiment, the nanoparticle can have 2 to 10 shells or 2 to 4 shells. For any additional shells that are present, each shell encloses the adjacent shell closest to the core (See FIG. 1C). The luminescent shell has an index of refraction and each of the shells present has an index of refraction. The shell enclosing the luminescent shell has an index of refraction that is about 0.0001 to 50% or about 0.0001 to 10%, different than the index of refraction of the luminescent shell. For any additional shells that are present, each can have an index of refraction that is about 0.0001 to 10%, or about 0.0001 to 2.5%, different than the adjacent shell closest to the core. The outer most shell furthest away from the core has an index of refraction that is about 90%, 110%, 97.5%, or 102.5% of that of the index of refraction of a material that the nanoparticle is disposed in. The nanoparticle can have a diameter of about 3 to 250 nm, which depends upon the diameter of the core and the number and thickness of shells.

The core can be made of materials such as silica, IIB-VIA semiconductor, IIIA-VA semiconductor, transition metal oxides, lanthanide metal oxides, halides, nitride, or oxynitride, oxyhalide, Ce-doped Lu, Y and Gd oxyorthosilicate and oxyorthosilicates made up with combinations of these elements, Ce-doped Sr and Ba hafanate, alkali halides, alkaline earth halides, and their solid solutions. The core can have a diameter of about 1 to 250 nm, and have a shape that is spherical, rod-like, or more complex.

As mentioned above, the luminescent material can emit radiation upon proper stimulation (e.g., light of a specific wavelength, x-rays, gamma-rays, neutrons, alpha particles). The luminescent material can emit radiation at a wavelength of about 200 nm to 5000 nm. As pointed out above, luminescent material may be in the form of nanoparticles cores or one or more shells, embedded in a luminescent or non-luminescent matrix, or combinations thereof. Luminescent material in the core provides better control over quantum confinement effects, while luminescent shells allow absorption of excitation light by the core with energy transfer to and luminescence from the shell. The luminescent shell can be made of materials listed herein for luminescent cores, such as semiconductors, transition metal oxides, lanthanide metal oxides, halides, nitrides, oxyhalides or oxynitrides, Ce-doped Lu, Y and Gd oxyorthosilicate and oxyorthosilicates made up with combinations of these elements, Ce-doped Sr and Ba hafanates, alkali halides, alkaline earth halides, and their solid solutions or a combination thereof. The luminescent shell can have a thickness of about 1 to 30 nm. Typical examples of semiconductors include $Zn_xCd_{1-x}Se_yS_zTe_{1-y-z}$ cores (x is about zero to one, y is about zero to one, and z is about zero to one) with larger bandgap $Zn_xCd_{1-x}Se_yS_zTe_{1-y-z}$ shells and $SiO_2$ shell. Typical examples of transition metal oxides include $Y_2O_3$ core doped with lanthanide ions (e.g., Ce, Eu or Tb) with an undoped $Y_2O_3$ shell and a $SiO_2$ shell. Typical examples of lanthanide metal oxides include $Gd_2O_3$ core doped with lanthanide ions (e.g., Ce, Eu or Tb) with an undoped $Gd_2O_3$ shell and a $SiO_2$ shell. Typical examples of alkali halide include undoped NaI core with a $SiO_2$ shell. Typical examples of alkaline earth halides include $BaF_2$ and $CaF_2$ core doped with lanthanide ions (e.g., Eu or Ce) with an undoped $BaF_2$ or $CaF_2$ shell and a $SiO_2$ shell. Typical examples of lanthanide halides include $CeF_3$, $LaF_3$, $CeBr_3$, $LaBr_3$, $YI_3$ core doped with lanthanide ions (e.g., Eu or Ce) with an undoped $PbF_2$, $PbCl_2$, $GdF_3$, $CeF_3$ or $LaF_3$ shell and a $Bi_2O_3$, Pb oxide, or $SiO_2$ shell. Organic materials such as silicones, thiophenes, trioctylphosphine, trioctylphosphine oxide, or a combination thereof, may be used for non-luminescent shells. As mentioned above, each of the layers has an index of refraction that is different than the index of refraction of the adjacent shell closest to the core by about 0.0001 to 50% or about 0.0001 to 2.5%. The index of refraction can be about 1.3 to 5. In an embodiment, it is contemplated that the two or more adjacent shells can have the same index of refraction. In an embodiment, the shells can be made of different types of material or the same material but the material contains different levels of dopant, where the selection is dependent upon the matching of the index of refraction of the nanoparticle with the matrix material. In an embodiment, if three or more shells are used, the combination of shells can include shells made of different materials and two or more layers with the same material but differentially doped.

The shells can be made of materials such as those described above for the embodiment where the core is a luminescent core. Each of the shells can individually have a thickness of about 1 to 30 nm or about 1 to 10 nm.

In an embodiment, the nanoparticles can be made by any of the well-known methods to synthesize nanoparticles. These methods include the so-called 'bottom up' methods such as colloidal growth, sol gel, solution precipitation, hot solution growth, hydrothermal, solvothermal, microemulsion, solution combustion, competitive chemical reaction, and a combination thereof, and so forth. The methods may also include the so-called 'top down' processes such as island growth and self-assembly processes from thin films grown by techniques including but not limited to molecular beam epitaxy (MBE), metallo-organic chemical vapor deposition (MO CVD), chemical vapor deposition (CVD), plasma enhanced processes, and so forth.

Figure 2:
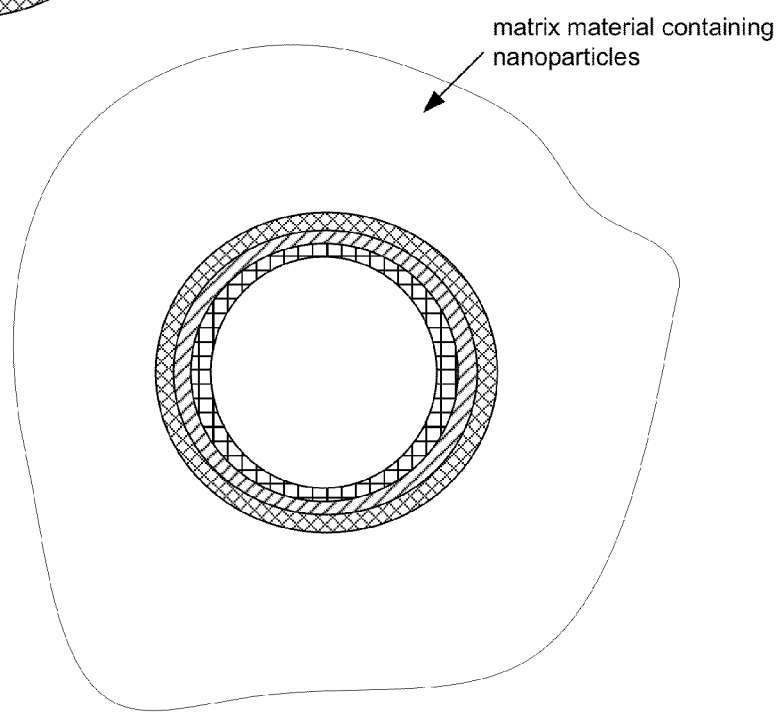
FIG. 2 illustrates an embodiment of the present disclosure.

One or more nanoparticles of the present disclosure can be disposed in matrix materials such as polymers, scintillating polymers, index-matched glass, glass-ceramic, scintillation glass or ceramics, and a combination thereof (See FIG. 2). In preferred embodiments, the matrix is made of silicones, polystyrene, poly(methyl methacrylate) (PMMA), or polyvinyl toluene (PVT) and may contain about 30% or less of, but not limited to, conjugated and aromatic organic molecules, 1,4-bis-2-(5-phenyloxazol-2-yl)benzene (POPOP), 1,4-bis(4-methyl-5-phenyloxazol-2-yl)benzene (DM-POPOP) 2-(4-biphenylyl)-5-phenyl-1,3,4-oxadiazole (PBD), 2-(4-biphenylyl)-5-(4-tert-butylphenyl)-1,3,4-oxadiazole (butyl-PBD),2-(4-biphenylyl)-6-phenylbenzoxazole (PBBO), 2-(1-napthyl)-5-phenyloxazole("alpha"-NPO), 1,4-bis(2-methylstyryl)benzene (bis-MSB), 2,5-bis(5-tert-butyl-2-benzoxazolyl)thiophene (BBOT), p-terphenyl, 2,7-diphenyl-9,9-dipropylfluorene (PPF), 2,7-bis(4-t-amylphenyl)-9,9-dipropylfluorene (d-amyl-PPF), 2,7-bis(4-methoxyphenyl)-9,9-dipropylfluorene (d-MeO-PPF), 7,7-diphenyl-9,9,9',9'-tetrapropy-2,2'-bifluorene (PF2), naphthalene, 2,5-diphenyloxazole (PPO or DPO), anthracene, stilbene, or a combination thereof. The nanoparticles can be engineered to have a similar or identical (identical defined to be the difference in the indices of refraction of less than 0.0001) index of refraction as the matrix material, while other nanoparticles can be about 1 to 20 nm in diameter to minimize light scattering. The index of refraction of the matrix material can be about 1.3 to 5. The concentration of nanoparticles in a material can be about 1% to 60% by volume.

While embodiments of the present disclosure are described in connection with the Examples and the corresponding text and figures, there is no intent to limit the disclosure to the embodiments in these descriptions. On the contrary, the intent is to cover all alternatives, modifications, and equivalents included within the spirit and scope of embodiments of the present disclosure.

EXAMPLES

An example of an index matched nanoparticle having a core with multiple shells is a 3 to 10 nm spherical core of CdS doped with Mn (with an index of refraction of approximately 2.5 at a wavelength of 589 nm), with about a 1 nm shell of ZnS (index of approximately 2.37 at a wavelength of 589 nm), covered by a second 1 to 5 nm shell of $Al_2O_3$ (index of approximately 1.76 at a wavelength of 589 nm), covered by a third 1 to 10 nm shell of $SiO_2$ (index of approximately 1.55 at a wavelength of 589 nm), embedded in a glass matrix with an index of about 1.46 for light with a wavelength of approximately 400 to 700 nm.

An example of an index matched nanoparticle having a core with multiple shells is a 3 to 10 nm spherical core of undoped CdSe (index of approximately 2.68 at a wavelength of 750 nm), with a about 1 nm shell of ZnS (index of approximately 2.3 at a wavelength of 750 nm), covered by a second 1 to 5 nm shell of $Al_2O_3$ (index of approximately 1.74 at a wavelength of 750 nm), covered by a third 1 to 10 nm shell of $SiO_2$ (index of approximately 1.54 at a wavelength of 750 nm), embedded in an acrylate polymer matrix with an index of about 1.49 for light with a wavelength of approximately 750 nm.

An example of an index matched nanoparticle having a core with multiple shells is a 3 to 10 nm spherical core of $Gd_2O_3$ doped with Eu (index of approximately 1.98 at a wavelength of 600 nm), with a about 1 nm shell of $Y_2O_3$ (index of approximately 1.96 at a wavelength of 589 nm), covered by a second 1 to 5 nm shell of $Al_2O_3$ (index of approximately 1.76 at a wavelength of 589 nm), covered by a third 1 to 10 nm shell of $SiO_2$ (index of approximately 1.55 at a wavelength of 589 nm), with the nanoparticles embedded in a glass matrix with an index of about 1.46 for light with a wavelength of approximately 400 to 700 nm.

An example of an index matched nanoparticle having a core with multiple shells is a 3 to 10 nm spherical core of $CaF_2$ doped with Eu or Ce (index of approximately 1.43 at a wavelength of 589 nm), with a about 1 nm shell of undoped $CaF_2$ (index of approximately 1.43 at a wavelength of 589 nm), covered by a second 1 to 5 nm shell of $Al_2O_3$ (index of approximately 1.76 at a wavelength of 589 nm), with the nanoparticles embedded in a $SF_6$ lead silicate glass matrix with an index of about 1.86 for light with a wavelength of approximately 589 nm.

An example of an index matched nanoparticle having a non-luminescent core with a luminescent shell and non-luminescent outer shells is a 3 to 10 nm spherical core of $Bi_2O_3$ (index of approximately 2.5 at a wavelength of 589 nm), with a 1 to 5 nm shell of $Y_2O_3$ doped with Eu (index of approximately 1.93 at a wavelength of 589 nm), covered by a second 1 to 5 nm shell of $Al_2O_3$ (index of approximately 1.76 at a wavelength of 589 nm), covered by a third 1 to 10 nm shell of $SiO_2$ (index of approximately 1.55 at a wavelength of 589 nm), with the nanoparticles embedded in a glass matrix with an index of about 1.46 for light with wavelengths of approximately 400 to 700 nm.

Another example is the above index matched nanoparticle embedded in polymethylmethacrylate (PMMA) or polystyrene or polyvinyl toluene (PVT) made luminescent by the addition of 1,4-bis-2-(5-phenyloxazol-2-yl)benzene (POPOP) with an index of approximately 1.49 for wavelengths in the 400-700 nm range.

Figure 3:
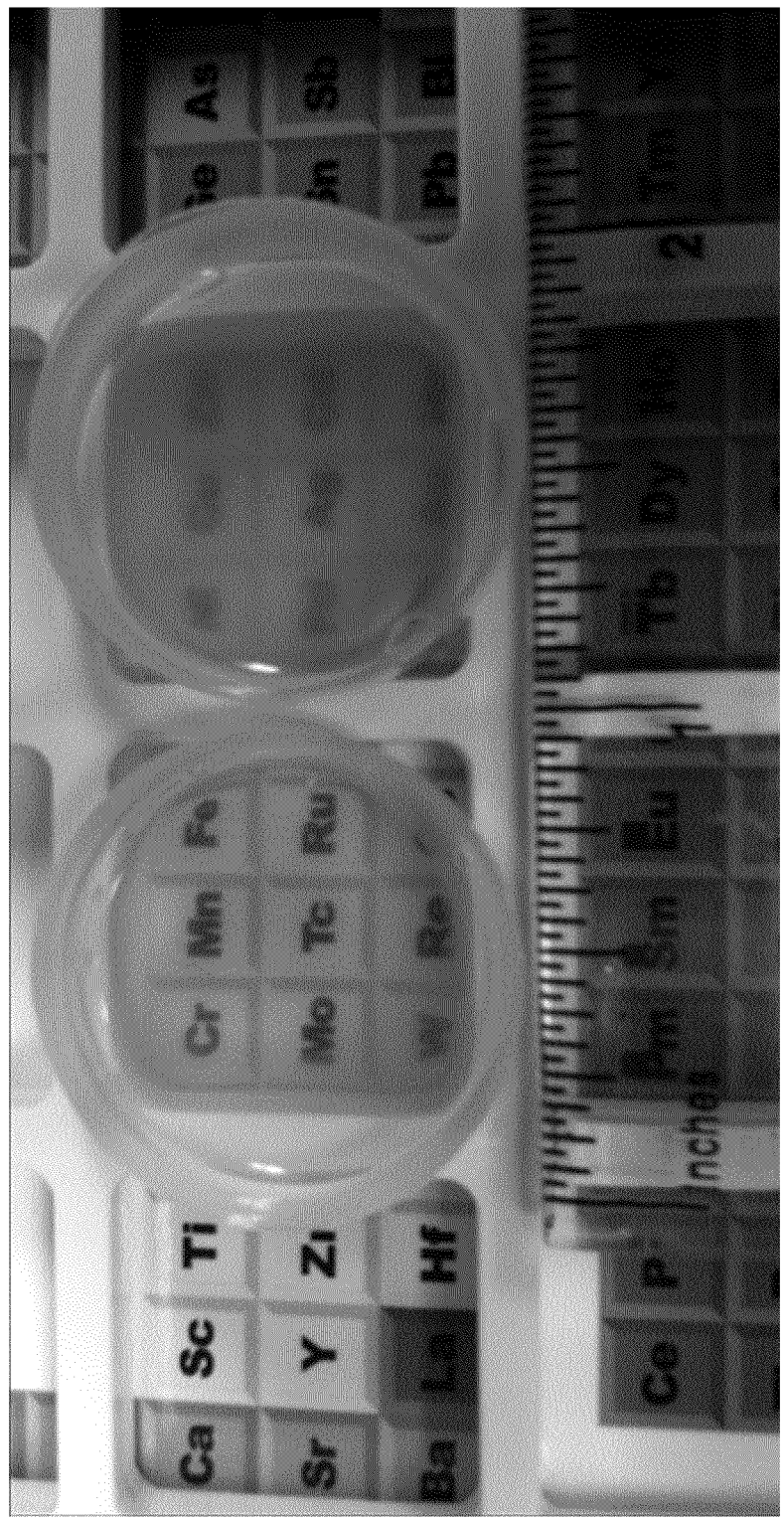
FIG. 3 illustrates an embodiment of the present disclosure.

Another example of an index matched nanoparticle having a luminescent core of $CaF_2$ doped with 3 mol % Eu (index of approximately 1.45 at a wavelength of 355 nm), with a 1 to 30 nm shell of $CaF_2$ doped with approximately 11 mol % Pr (index of approximately 1.47 at a wavelength of 477 nm), with the nanoparticles embedded in polymethylmethacrylate (PMMA) with an index of approximately 1.49 for a wavelengths in the 400-700 nm range. This is shown in FIG. 3 where samples were prepared by dispersing 0.1 g of nanoparticles in PMMA. Left sample contains $CaF_2$:Eu (3 mol %) cores surrounded by 1 shell of $CaF_2$:Pr (11 mol %). Right sample contains $CaF_2$:Eu (3 mol %) cores, but made in such way that they have the same average nanoparticle size as in the other sample. In both cases the average nanoparticle size is about 25 nm to induce similar light scattering conditions. These results highlight the effect of matching the index of the refraction of the core with that of the host by means of an intermediate index of refraction value created by the Pr-doped shell in achieving better optical transparency. In the photograph, both samples have thickness of about 0.7 mm, and are suspended from background by the same distance.

Another example of luminescent material containing non-luminescent nanoparticle and index matched luminescent nanoparticle is $LaF_3$:Ce/$LaF_3$:Er core/shell nanoparticle (index of refraction of about 1.7 at about 400 nm) together with nonluminescent 1 to 10 nm in diameter $PbF_2$ (index of refraction ranging from about 1.9 at 300 nm to about 1.7 at 700 nm) nanoparticles in a polymeric matrix like polystyrene (index of refraction of about 1.55-1.59), poly(methyl methacrylate) (PMMA) (index of refraction of about 1.49 at about 588 nm), or polyvinyl toluene (PVT) (index of refraction of about 1.58 at about 423 nm) with or without 10% of POPOP or DM-POPOP or PBD or butyl-PBD or PPO.

Another example of luminescent material containing non-luminescent index matched nanoparticle and luminescent nanoparticle is $PbF_2$/$PbF_2$:Er core/multi-shell (index of refraction ranging from about 1.9 at 300 nm to about 1.7 at 700 nm) and 5 nm diameter $LaF_3$:Ce nanoparticle (index of refraction of about 1.7 at about 400 nm) in a polymeric matrix like polystyrene (index of refraction of about 1.55-1.59), poly(methyl methacrylate) (PMMA) (index of refraction of about 1.49 at about 588 nm), or polyvinyl toluene (PVT) (index of refraction of about 1.58 at about 423 nm) with or without 10% of POPOP or DM-POPOP or PBD or butyl-PBD or PPO.

Another example of luminescent material containing index matched nanoparticles of non-luminescent $PbF_2$/$PbF_2$:Pr core/multi-shell (index of refraction ranging from about 1.9 at 300 nm to about 1.7 at 700 nm) embedded in a luminescent polymeric matrix such as polystyrene (index of refraction of about 1.55-1.59) or polyvinyl toluene (index of refraction of about 1.58 at about 423 nm) containing, but not limited to, POPOP or PPO.

Another example of luminescent material containing matching luminescent and non-luminescent nanoparticles is $PbCl_2$/$PbCl_2$:Er core/multi-shell (index of refraction of about 2.2) and $BaF_2$:Ce/$BaF_2$/$BaF_2$:Pr core/multi-shell (index of refraction ranging from about 1.5 at 300 nm to about 1.4 at 700 nm) in a polymeric matrix such as PMMA (index of refraction of about 1.49 at about 588 nm), polystyrene (index of refraction of about 1.55-1.59) or polyvinyl toluene (index of refraction of about 1.58 at about 423 nm).

Another example of luminescent material consist of having non-luminescent and luminescent nanoparticles, with at least one of them index matched with the polymeric matrix and at least one smaller than about 10 nm, embedded in a luminescent or scintillating polymeric matrix like polystyrene (index of refraction of about 1.55-1.59), poly(methyl methacrylate) (PMMA) (index of refraction of about 1.49 at about 588 nm), or polyvinyl toluene (PVT) (index of refraction of about 1.58 at about 423 nm).

Figure 4:
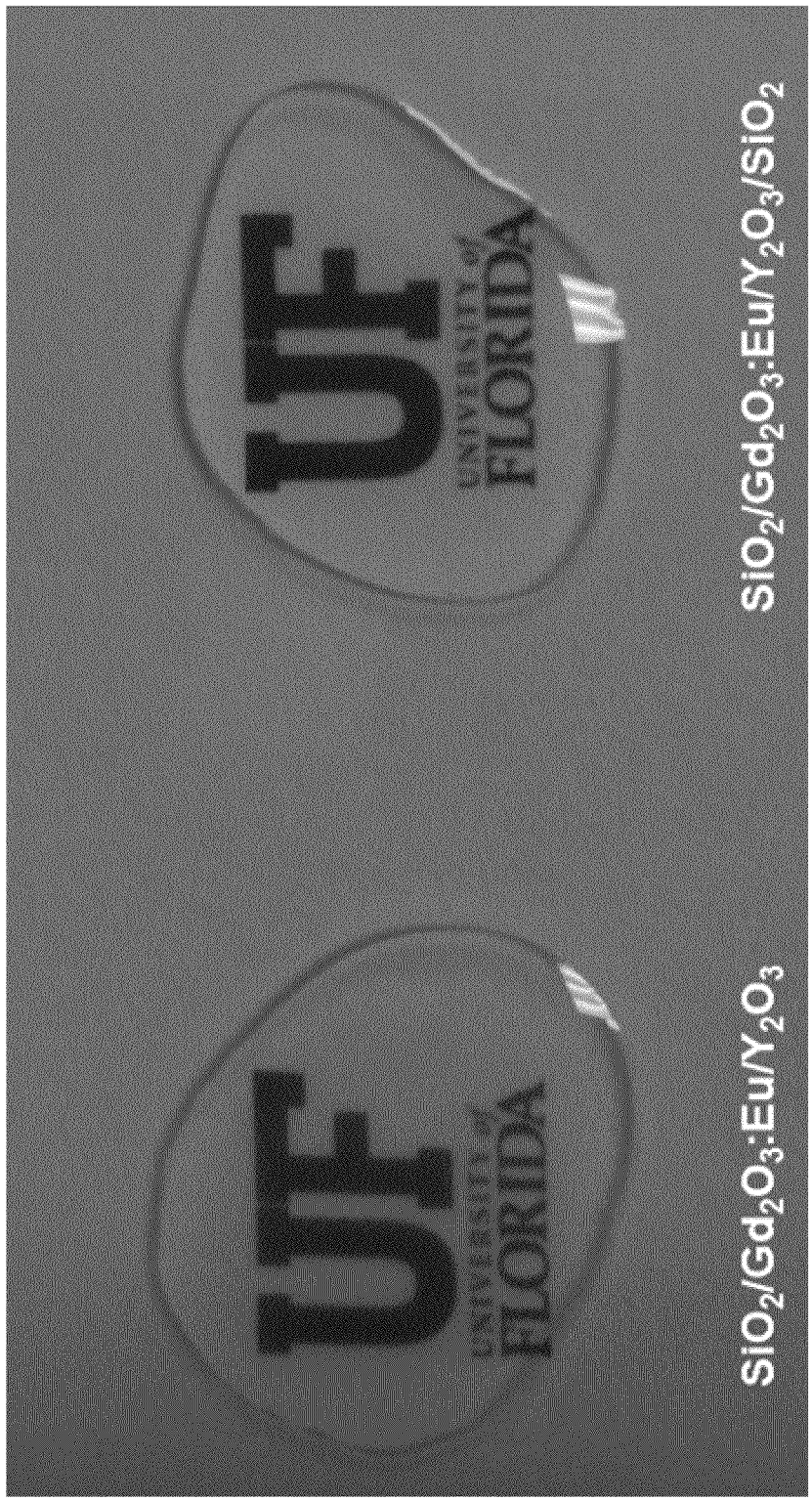
FIG. 4 illustrates an embodiment of the present disclosure.

FIG. 4 shows more optical scattering (left) for nanoparticles with a silica core surrounded by a$Gd_2O_3$:$Eu^{3+}$ concentric luminescent shell (n=1.95) and an outer shell of $Y_2O_3$ (n=1.9) in a PMMA solution (n=1.48), as compared to the same concentration of nanoparticles with the same $SiO_2$ core/

Gd$_2$O$_3$:Eu$^{3+}$ shell/Y$_2$O$_3$ shell structure plus a third concentric shell of SiO$_2$ (n=1.47) to match the refractive index of the PMMA (less scattering in samples to the right).

Figure 5:
FIG. 5 illustrates an embodiment of the present disclosure.

FIG. 5 shows more optical scattering for nanoparticles with a silica core surrounded by a luminescent Gd$_2$O$_3$:Eu$^{3+}$ concentric shell (n=1.95-designated core/single shell). The second sample on the top row shows about the same scattering from the same silica core/Gd$_2$O$_3$:Eu$^{3+}$ shell, with a second shell of Y$_2$O$_3$ (n=1.9-designated core/dual shell). The two images on the right are from core/dual shell nanoparticles covered with a third shell of SiO$_2$ (n=1.47) which improved the index matching with the PMMA solution (n=1.48). More scattering is obvious in the core/triple shell sample when the thickness of the silica shell was 6 nm, as compared to less scattering when the silica shell was 17 nm thick.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to the measurement technique and the type of numerical value. In addition, the phrase "about 'x' to 'y'" includes "about 'x' to about 'y'". When a range includes "zero" and is modified by "about" (e.g., about one to zero or about zero to one), about zero can include, 0, 0.1. 0.01, or 0.001.

While only a few embodiments of the present disclosure have been shown and described herein, it will become apparent to those skilled in the art that various modifications and changes can be made in the present disclosure without departing from the spirit and scope of the present disclosure. All such modification and changes coming within the scope of the appended claims are intended to be carried out thereby.

We claim at least the following:

1. A luminescent or scintillation material, comprising:
a nanoparticle with a core having an index of refraction and at least one shell partially or totally enclosing the core, wherein when an additional shell is present, each partially or totally enclose the adjacent shell closest to the core, wherein each of the at least one shells has an index of refraction, wherein the shell enclosing the core has an index of refraction that is about 0.0001 to 50% different than the index of refraction of the core, wherein when one or more additional shells are present each will have an index of refraction that is about 0.0001 to 20% different than the adjacent shell closest to the core, wherein the outer most shell furthest away from the core has an index of refraction that is about 0.0001 to 10% different from that of the index of refraction of a matrix material in which the nanoparticle is dispersed, wherein the core is a non-metal, and wherein each shell is independently selected from a non-metal.

2. The luminescent or scintillating material of claim 1, wherein the diameter of the core of the nanoparticle is about 1 to 250 nm and the thickness of each shell present is about 1 to 30 nm.

3. The luminescent or scintillating material of claim 1, wherein the core is doped with one or more dopants, wherein the dopant is selected from the group consisting of: a transition metal ion, a lanthanide ion, an alkali metal, an alkali earth metal, and a combination thereof, wherein the dopant does not change the nature of the core from non-metallic to metallic.

4. The luminescent or scintillating material of claim 1, wherein the core is doped with at least Ce.

5. The luminescent or scintillating material of claim 1, wherein one or more shells is doped by one or more ionic species.

6. The luminescent or scintillating material of claim 5, wherein at least two shells are doped by one or more ionic species.

7. The luminescent or scintillating material of claim 5, wherein each doped shell includes the same type of dopant, wherein the amount of dopant in each doped layer is different.

8. The luminescent or scintillating material of claim 5, wherein each doped shell includes at least one different type of dopant.

9. The luminescent or scintillating material of claim 5, wherein the difference between the index of refraction of adjacent shells is up to about 10%.

10. The luminescent or scintillating material of claim 1, wherein one or more shells is doped with at least Ce.

11. The luminescent or scintillating material of claim 1, where the core of the nanoparticle is luminescent.

12. The luminescent or scintillating material of claim 1, where at least one shell of the nanoparticle is luminescent.

13. The luminescent or scintillating material of claim 1, where the nanoparticle contains a combination of a luminescent core and at least one luminescent shell.

14. The luminescent or scintillating material of claim 1, where the matrix is luminescent.

15. The luminescent or scintillating material of claim 1, wherein the matrix and the nanoparticle are luminescent.

16. The luminescent or scintillating material of claim 1, wherein the matrix is luminescent and the nanoparticle is non-luminescent.

17. The luminescent or scintillating material of claim 1, wherein the matrix includes at least 50% of silicone, polystyrene or poly(methyl methacrylate) (PMMA) or polyvinyl toluene (PVT).

18. The luminescent or scintillating material of claim 1, where the matrix contains less than 50% of conjugated and aromatic organic molecules, 1,4-bis-2-(5-phenyloxazol-2-yl)benzene (POPOP), 1,4-bis(4-methyl-5-phenyloxazol-2-yl)benzene (DM-POPOP) 2-(4-biphenylyl)-5-phenyl-1,3,4-oxadiazole (PBD), 2-(4-biphenylyl)-5-(4-tert-butylphenyl)-1,3,4-oxadiazole (butyl-PBD),2-(4-biphenylyl)-6-phenylbenzoxazole (PBBO), 2-(1-napthyl)-5-phenyloxazole ("alpha"-NPO), 1,4-bis(2-methylstyryl)benzene (bis-MSB), 2,5-bis(5-tert-butyl-2-benzoxazolyl)thiophene (BBOT), p-terphenyl, 2,7-diphenyl-9,9-dipropylfluorene (PPF), 2,7-bis(4-t-amylphenyl)-9,9-dipropylfluorene (d-amyl-PPF), 2,7-bis(4-methoxyphenyl)-9,9-dipropylfluorene (d-MeO-PPF), 7,7-diphenyl-9,9,9',9'-tetrapropy-2,2'-bifluorene (PF2), naphthalene, 2,5-Diphenyloxazole (PPO or DPO), anthracene, stilbene, or a combination thereof.

19. A luminescent or scintillating material comprising two or more types of nanoparticles, with at least one type of nanoparticle having at least one shell that matches the index of refraction of the matrix, wherein the nanoparticle has a core having an index of refraction and at least one shell partially or totally enclosing the core, wherein when an additional shell is present, each partially or totally enclose the adjacent shell closest to the core, wherein each of the at least one shells has an index of refraction, wherein the shell enclosing the core has an index of refraction that is about 0.0001 to 50% different than the index of refraction of the core, wherein when one or more additional shells are present each will have an index of refraction that is about 0.0001 to 20% different than the adjacent shell closest to the core, wherein the outer most shell furthest away from the core has an index of refraction that is about 0.0001 to 10% different from that of the index of refraction of the matrix material, wherein the core is a non-metal, and wherein each shell is independently selected from a non-metal.

20. The luminescent or scintillating material of claim 19, where the matrix is luminescent and the nanoparticles are non-luminescent.

21. The luminescent or scintillating material of claim 19, where the matrix and at least one type of nanoparticle are luminescent.

22. The luminescent or scintillating material of claim 19, where at least one type of nanoparticle is luminescent and the matrix is non-luminescent.

23. The luminescent or scintillating material of claim 19, where the matrix includes at least 50% of silicone, polystyrene or poly(methyl methacrylate) (PMMA) or polyvinyl toluene (PVT).

24. The luminescent or scintillating material of claim 19, where the matrix is contains less than 50% of conjugated and aromatic organic molecules, 1,4-bis-2-(5-phenyloxazol-2-yl) benzene (POPOP), 1,4-bis(4-methyl-5-phenyloxazol-2-yl) benzene (DM-POPOP) 2-(4-biphenylyl)-5-phenyl-1,3,4-oxadiazole (PBD), 2-(4-biphenylyl)-5-(4-tert-butylphenyl)-1,3,4-oxadiazole (butyl-PBD),2-(4-biphenylyl)-6-phenylbenzoxazole (PBBO), 2-(1-napthyl)-5-phenyloxazole ("alpha"-NPO), 1,4-bis(2-methylstyryl)benzene (bis-MSB), 2,5-bis(5-tert-butyl-2-benzoxazolyl)thiophene (BBOT), p-terphenyl, 2,7-diphenyl-9,9-dipropylfluorene (PPF), 2,7-bis(4-t-amylphenyl)-9,9-dipropylfluorene (d-amyl-PPF), 2,7-bis(4-methoxyphenyl)-9,9-dipropylfluorene (d-MeO-PPF), 7,7-diphenyl-9,9,9',9'-tetrapropy-2,2'-bifluorene (PF2), naphthalene, 2,5-Diphenyloxazole (PPO or DPO), anthracene, stilbene, or a combination thereof.

25. The luminescent or scintillating material of claim 19, wherein the core is doped with at least Ce.

26. The luminescent or scintillating material of claim 19, wherein one or more shells is doped with at least Ce.

27. The luminescent or scintillating material of claim 19, wherein one or more shells is a polymeric material with and without a luminescent dopant.

28. A luminescent or scintillating material comprising a nanoparticle that has at least one shell that matches the index of refraction of a luminescent matrix, wherein the nanoparticle has a core having an index of refraction and at least one shell partially or totally enclosing the core, wherein when an additional shell is present, each partially or totally enclose the adjacent shell closest to the core, wherein each of the at least one shells has an index of refraction, wherein the shell enclosing the core has an index of refraction that is about 0.0001 to 50% different than the index of refraction of the core, wherein when one or more additional shells are present each will have an index of refraction that is about 0.0001 to 20% different than the adjacent shell closest to the core, wherein the outer most shell furthest away from the core has an index of refraction that is about 0.0001 to 10% different from that of the index of refraction of the luminescent matrix, wherein the core is a non-metal, and wherein each shell is independently selected from a non-metal.

29. A radiation detection or measurement method, comprising:
exposing a luminescent or scintillating material to a radiation energy, radioactive material, neutron, energetic particle, x-rays or, gamma-rays, wherein the luminescent material includes a plurality of index of refraction matched nanoparticles in a matrix, wherein the radiation source causes luminescence or scintillation in at least one type of nanoparticle, wherein the index of refraction of the outermost shell of the index of refraction matched nanoparticle is about 0.0001 to 10% different from that of the index of refraction of the matrix, wherein the nanoparticle has a core having an index of refraction and at least one shell partially or totally enclosing the core, wherein when an additional shell is present, each partially or totally enclose the adjacent shell closest to the core, wherein each of the at least one shells has an index of refraction, wherein the shell enclosing the core has an index of refraction that is about 0.0001 to 50% different than the index of refraction of the core, wherein when one or more additional shells are present each will have an index of refraction that is about 0.0001 to 20% different than the adjacent shell closest to the core, wherein the outer most shell furthest away from the core has an index of refraction that is about 0.0001 to 10% different from that of the index of refraction of the matrix; and
detecting or measuring the luminescence or scintillation from the luminescent material.

30. A radiation detection or measurement method, comprising:
exposing a luminescent or scintillating material to a radiation energy, radioactive material, neutron, energetic particle, x-rays or, gamma-rays, wherein the luminescent material includes a plurality of index of refraction matched nanoparticles of in a matrix, wherein the radiation source causes luminescence or scintillation of the matrix, wherein the index of refraction of the outermost shell of the index of refraction matched nanoparticle is about 0.0001 to 10% different from that of the index of refraction of the matrix, wherein the nanoparticle has a core having an index of refraction and at least one shell partially or totally enclosing the core, wherein when an additional shell is present, each partially or totally enclose the adjacent shell closest to the core, wherein each of the at least one shells has an index of refraction, wherein the shell enclosing the core has an index of refraction that is about 0.0001 to 50% different than the index of refraction of the core, wherein when one or more additional shells are present each will have an index of refraction that is about 0.0001 to 20% different than the adjacent shell closest to the core, wherein the outer most shell furthest away from the core has an index of refraction that is about 0.0001 to 10% different from that of the index of refraction of the matrix; and
detecting or measuring the luminescence or scintillation from the luminescent material.

31. A radiation detection or measurement method, comprising:
exposing a luminescent or scintillating material to a radiation energy, radioactive material, neutron, energetic particle, x-rays, or gamma-rays, wherein the luminescent material includes a plurality of index of refraction matched nanoparticles of in a matrix, wherein the radiation source causes luminescence or scintillation of at least one type of nanoparticle and of the matrix, wherein the index of refraction of the outermost shell of the index of refraction matched nanoparticle is about 0.0001 to 10% different from that of the index of refraction of the matrix, wherein the nanoparticle has a core having an index of refraction and at least one shell partially or totally enclosing the core, wherein when an additional shell is present, each partially or totally enclose the adjacent shell closest to the core, wherein each of the at least one shells has an index of refraction, wherein the shell enclosing the core has an index of refraction that is about 0.0001 to 50% different than the index of refraction of the core, wherein when one or more additional shells are present each will have an index of refraction that is about 0.0001 to 20% different than the adjacent shell closest to the core, wherein the outer most shell furthest away from the core has an index of refraction that is about 0.0001 to 10% different from that of the index of refraction of the matrix; and detecting or measuring the luminescence or scintillation from the luminescent material.

32. A radiation detector, comprising:

a structure comprising a luminescent or scintillating material, wherein the luminescent material includes a plurality of index of refraction matched nanoparticles of in a matrix, wherein the radiation source causes luminescence or scintillation of at least one type of nanoparticle, wherein the index of refraction of the outermost shell of the index of refraction matched nanoparticles is about 0.0001 to 10% different from that of the index of refraction of the matrix; and a photodetector and its electronics and power supply to detect or measure the luminescence or scintillation from the index of refraction matched nanoparticles, wherein the nanoparticle has a core having an index of refraction and at least one shell partially or totally enclosing the core, wherein when an additional shell is present, each partially or totally enclose the adjacent shell closest to the core, wherein each of the at least one shells has an index of refraction, wherein the shell enclosing the core has an index of refraction that is about 0.0001 to 50% different than the index of refraction of the core, wherein when one or more additional shells are present each will have an index of refraction that is about 0.0001 to 20% different than the adjacent shell closest to the core, wherein the outer most shell furthest away from the core has an index of refraction that is about 0.0001 to 10% different from that of the index of refraction of the matrix.

33. A radiation detector, comprising:

a structure comprising a luminescent material, wherein the luminescent material includes a plurality of index of refraction matched nanoparticles of in a matrix, wherein the radiation source causes luminescence or scintillation of the matrix, wherein the index of refraction of the outermost shell of the index of refraction matched nanoparticles is about 0.0001 to 10% different from that of the index of refraction of the matrix; and a photodetector and its electronics and power supply to detect or measure the luminescence or scintillation from the index of refraction matched nanoparticles, wherein the nanoparticle has a core having an index of refraction and at least one shell partially or totally enclosing the core, wherein when an additional shell is present, each partially or totally enclose the adjacent shell closest to the core, wherein each of the at least one shells has an index of refraction, wherein the shell enclosing the core has an index of refraction that is about 0.0001 to 50% different than the index of refraction of the core, wherein when one or more additional shells are present each will have an index of refraction that is about 0.0001 to 20% different than the adjacent shell closest to the core, wherein the outer most shell furthest away from the core has an index of refraction that is about 0.0001 to 10% different from that of the index of refraction of the matrix.

34. A radiation detector, comprising:

a structure comprising a luminescent or scintillating material, wherein the luminescent material includes a plurality of index of refraction matched nanoparticles of in a matrix, wherein the radiation source causes luminescence or scintillation of the matrix and at least one type of nanoparticle, wherein the index of refraction of the outermost shell of the index of refraction matched nanoparticles is about 0.1 to 10% different from that of the index of refraction of the matrix; and a photodetector and its electronics and power supply to detect or measure the luminescence or scintillation from the index of refraction matched nanoparticles, wherein the nanoparticle has a core having an index of refraction and at least one shell partially or totally enclosing the core, wherein when an additional shell is present, each partially or totally enclose the adjacent shell closest to the core, wherein each of the at least one shells has an index of refraction, wherein the shell enclosing the core has an index of refraction that is about 0.0001 to 50% different than the index of refraction of the core, wherein when one or more additional shells are present each will have an index of refraction that is about 0.0001 to 20% different than the adjacent shell closest to the core, wherein the outer most shell furthest away from the core has an index of refraction that is about 0.0001 to 10% different from that of the index of refraction of the matrix.

* * * * *